July 10, 1962   J. G. RAY   3,043,983

ELECTRON DISCHARGE LAMP

Filed April 6, 1960

JOHN G. RAY
INVENTOR

BY
ATTORNEY

United States Patent Office 3,043,983
Patented July 10, 1962

3,043,983
ELECTRON DISCHARGE LAMP
John G. Ray, Topsfield, Mass., assignor to Sylvania Electric Products Inc., a corporation of Massachusetts
Filed Apr. 6, 1960, Ser. No. 20,477
8 Claims. (Cl. 313—221)

This invention relates to a glass composition for use in the treatment of the interior surface of glass envelopes of fluorescent lamps. More specifically, this invention relates to a glass coating composition which is to be utilized in an aperture lamp.

It has been determined that when a lamp is made of clear glass with no phosphor coating it will tend to discolor upon burning. This discoloration, which occurs on the inner surface of the glass envelope, is the result of a mercury-alkali reaction.

It has further been determined that rate and density of the discoloration of the glass envelope is proportional to the amount of alkali, specifically sodium, which is available at the glass surface to react with mercury.

Fluorescent lamps, as presently made, use a soda-lime glass envelope material; that is, one having an alkali sodium oxide ($Na_2O$) content higher than approximately 15%. During the lamp processing, the glass envelope is baked at a temperature of 550° C. to 600° C. to remove the binder from the phosphor. In addition, during evacuation, the envelope is reheated to approximately 300° C. to facilitate the removal of molecules of gas adsorbed on the glass and phosphor surface. Each of these bakeouts is quite necessary; however, each tends to diffuse alkali from the glass of the envelope to the surface. During lamp operation, mercury ions strike this alkali covering and a black-brown deposit of a mercury-alkali amalgam is formed. It is apparent that any dark discoloration will reduce the light transmission since the absorbed light will be converted to heat.

In an aperture lamp this problem of discoloration is accentuated to a higher degree. An aperture lamp is a very high output type of fluorescent lamp which is designed with a phosphor coating extending part way around the lamp and in such a manner as to leave a slot of clear glass throughout the length of the lamp. The purpose of this construction is to concentrate a beam of light through the clear glass section.

While the composition for surface treatment of the glass envelope of this invention finds particular use in the aperture lamp, it is apparent that similar compositions may be used in conventional fluorescent lamps with similar superior results where the glass darkening imposes a problem and where the lamp is used at high outputs.

It is an object of this invention to provide a glass layer on the inner surface of the glass envelope which inhibits the mercury-alkali reaction.

It is a further object of this invention to provide for a glass envelope with inner surface of alkali-free glass of different composition than the envelope.

It is still a further object of this invention to provide for a lamp having the novel lead borosilicate glass coating composition deposited on the inner surface of the glass envelope.

Other features, objects and advantages will become apparent from the following description, taken in connection with the accompanying drawings.

Figure 1:
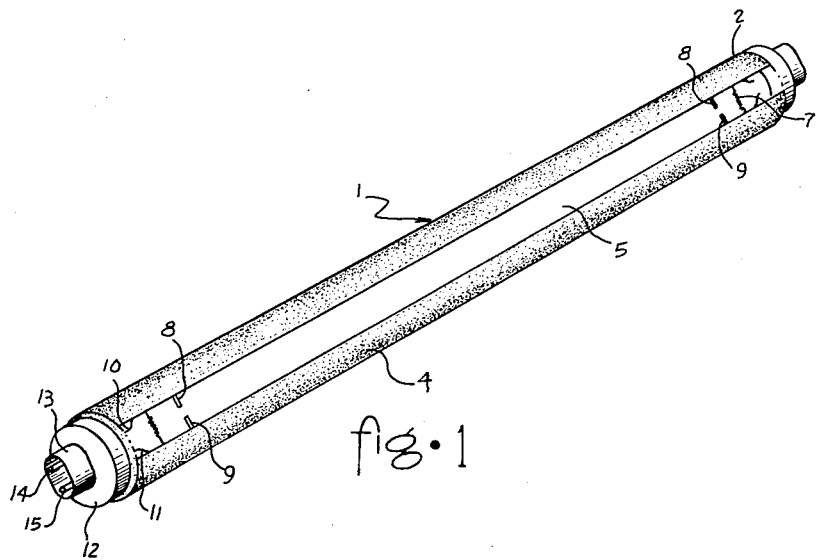
FIGURE 1 shows one embodiment of a device according to this invention.
Figure 2:
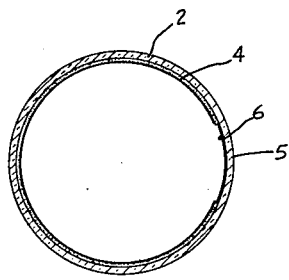
FIGURE 2 shows a cross section through the middle of the device.

In FIGURE 1, the lamp 1 has a sealed hollow glass tube 2 containing a filling of 85% argon and 15% helium (although other suitable gas fillings may be used). On the inside surface of the glass envelope there is a coating 4 of the phosphor. This phosphor may be, for example, calcium halophosphate activated with antimony and manganese or any other suitable fluorescent lamp phosphor. This coating is shown in section in FIGURE 2. The phosphor coating 4 is shown to extend around about 315° of the circumference of the tube, the other 45 degree portion 5 of the tube being left free of phosphor coating to allow the light to emerge therethrough. At least on the clear portion 5 there is deposited the thin layer 4 of the lead borosilicate glass composition. It is important to note that this portion 5 should only be coated to such an extent that the direct passage of light therethrough is not substantially affected and the tube remains transparent but still prevents the mercury-alkali amalgam formation. It has been determined that coatings having a thickness of about .0005 inch to .001 inch perform this function. Above this range the glass tends to become more translucent and below the mercury-alkali reaction will not be substantially inhibited.

The aperture utilized in the tube is to be determined by the amount of light desired. Thus, other sizes than the 45° above noted may be utilized, such as between 20° and 90°. The brightness in the aperture increases as the width of the aperture is reduced.

At each end of the glass tube 1, there is an electrode comprising an oxide-coated tungsten coil 7, two auxiliary anodes 8, 9, and the support and lead-in wires 10, 11, as shown for example in a United States patent application Serial No. 742,928, filed June 18, 1958, by John F. Waymouth et al. for a Fluorescent Lamp, now Patent No. 2,961,566. The usual insulating plastic base 12, with the boss 13 carrying contacts 14, 15, can be as shown, for example, in United States Patent 2,896,187, issued July 21, 1959, to R. B. Thomas and S. C. Shappell for a Lamp Base, or some other suitable base can be used.

The phosphor coating 4 may be applied at first over the entire glass envelope by methods well known in the art and then scraped or brushed off from the aperture 5 of the glass tube 2, as desired. The barrier layer may be deposited over only the aperture itself or it may be coated over the entire glass surface and the phosphor deposited over it.

The invention finds particular application when the glass envelope 2 has the usual soda-alkali composition; that is, one having a soda content higher than 15%.

This composition, expressed as an oxide composition, is generally as noted in Table I.

Table I

| | Percent |
|---|---|
| $SiO_2$ | 73.6 |
| $Na_2O$ | 16.0 |
| $K_2O$ | .6 |
| $Al_2O_3$ | 1.0 |
| CaO | 5.2 |
| MgO | 3.6 |

Of course, as is apparent, the invention will find use as a coating in many other types of glass such as one which tends to darken upon burning due to the mercury-alkali amalgam formation.

It has been determined that by using a glass layer having an oxide composition such as shown in Table II, good results are obtained.

Table II

| Lead Borosilicate Glass Composition | Range, percent | Prepared, percent |
|---|---|---|
| PbO | 70–74 | 72 |
| $SiO_2$ | 11–15 | 14 |
| $B_2O_3$ | 11–15 | 14 |

After a suitable batch composition has been prepared, it is melted in a refractory container and poured in a molten state into water. The resulting frit is then ground to pass through a 200 mesh screen. At this point, the glass is ready for use as a coating composition.

It is apparent that variations of this composition are possible. Such variations may be for example adding another material to the glass composition shown in Table II, thus forming a barrier layer between the mercury ions and the alkali of the envelope which, of course, does not darken. Such materials are disclosed in my co-pending application entitled Fluorescent Lamp, Serial No. 20,487, filed April 6, 1960.

These variations may be prepared by mixing suitable proportions of a refractory oxide and the glass composition described in Table II, above. For example, 75% $Al_2O_3$ and 25% of the glass of Table II may be used.

Whether the glass composition is the mixture described in Table II above or whether refractory oxides have been added, the method of coating the glass composition to the envelope is substantially the same.

Glass envelopes are prepared by washing in clear, hot water and then drying thoroughly. The envelopes are then coated with a suspension of the alkali-free glass in fine powder form in a lacquer vehicle. Suspensions of 20 grams of the glass in 1750 cc. of vehicle shown in Table III have been found desirable.

Table III

[Percent by weight]

| Lacquer | Vehicle |
| --- | --- |
| 84% | Xylol. |
| 11% | Butanol. |
| 2.5% | Dibutyl Phthalate. |
| 2.5% | Ethyl Cellulose. |

After coating and drying, the glass envelopes are baked just below their deformation temperature. In the case of soda-lime glass, this would be in the range of 550° C.–600° C. The heat treatment causes the surface coating to become fused to the glass envelope. The barrier layer thus formed prevents the reaction of mercury with the alkali components such as sodium and potassium in the glass of the envelope.

When soda-lime glass, as is described in Table I above, is used in the aperture lamp with no prior surface treatment, the clear glass area becomes excessively darkened within the first one hundred hours of lamp burning. However, when the same glass has been treated with an alkali-free glass such as described in Table II and baked prior to phosphor coating, there is a marked improvement in the degree of darkening during life. This difference is shown in Table IV.

Table IV

| Glass | Percent Maintenance From 0 Hours | |
| --- | --- | --- |
| | 100 Hrs. | 500 Hrs. |
| Soda-lime Glass | 78 | 62 |
| Soda-lime Glass Coated With Alkali-free Lead Borosilicate Glass. | 97 | 90 |

It is apparent that other variations and modifications may be made by those skilled in the art; it is my intent, however, to be limited only by the scope of the appended claims.

I claim:

1. An electron discharge lamp comprising a glass envelope containing amalgam forming materials, mercury vapor and means to produce an electron discharge in said lamp and a barrier layer in transparent thickness of an alkali-free lead-borosilicate glass for inhibiting an alkali-mercury amalgam formation disposed upon the inner surface of said envelope.

2. An electron discharge lamp comprising a glass envelope containing amalgam forming materials, mercury vapor and means to produce an electron discharge in said lamp and a barrier layer in transparent thickness of an alkali-free lead-borosilicate glass for inhibiting an alkali-mercury amalgam formation disposed upon the inner surface of said envelope, said layer having a composition expressed as an oxide of about 70% to 74% PbO, about 11% to 15% $SiO_2$ and about 11% to 15% $B_2O_3$.

3. A glass envelope for use in an electron discharge lamp said envelope containing amalgam forming materials and having a layer in transparent thickness of an alkali-free lead-borosilicate glass for inhibiting an alkali-mercury amalgam formation disposed upon the inner surface.

4. A glass envelope for use in an electron discharge lamp said envelope containing amalgam forming materials and having a layer of an alkali-free lead-borosilicate glass for inhibiting an alkali-mercury amalgam formation disposed upon the inner surface thereof, said layer having a composition expressed as an oxide of about 70% to 74% PbO, about 11% to 15% $SiO_2$ and about 11% to 15% $B_2O_3$.

5. A fluorescent lamp comprising: a glass envelope containing amalgam forming materials, mercury vapor and means to produce an electron discharge in said envelope, a barrier layer in transparent thickness of an alkali-free lead-borosilicate glass for inhibiting an alkali-mercury amalgam formation disposed upon the inner surface of said envelope and a phosphor coating on said glass in contact with said mercury vapor.

6. A fluorescent lamp comprising: a glass envelope containing amalgam forming materials, mercury vapor and means to produce an electron discharge in said envelope, a barrier layer in transparent thickness of an alkali-free lead-borosilicate glass for inhibiting an alkali-mercury amalgam formation disposed upon the inner surface of said envelope, said layer having a composition expressed as an oxide of about 70% to 74% PbO, about 11% to 15% $SiO_2$ and about 11% to 15% $B_2O_3$ and a phosphor coating on said glass in contact with said mercury vapor.

7. A fluorescent lamp comprising: a glass envelope containing amalgam forming materials, mercury vapor and means to produce an electron discharge in said envelope, a barrier layer in transparent thickness of an alkali-free lead-borosilicate glass for inhibiting an alkali-mercury amalgam formation disposed upon the inner surface of said envelope and a phosphor coating part way around the inner surface of said glass in contact with said mercury vapor.

8. A fluorescent lamp comprising a glass envelope containing amalgam forming materials, mercury vapor and means to produce an electron discharge in said envelope, a barrier layer in transparent thickness of an alkali-free lead-borosilicate glass for inhibiting an alkali-mercury amalgam formation disposed upon the inner surface of said envelope, said layer having a composition expressed as an oxide of about 70% to 74% PbO, about 11% to 15% $SiO_2$ and about 11% to 15% $B_2O_3$ and a phosphor coating part way around the inner surface of said glass in contact with said mercury vapor.

References Cited in the file of this patent

UNITED STATES PATENTS

| | | |
| --- | --- | --- |
| 2,177,728 | Krefft | Oct. 31, 1939 |
| 2,182,732 | Meyer | Dec. 5, 1939 |
| 2,295,626 | Beese | Sept. 15, 1942 |
| 2,362,384 | Libby | Nov. 7, 1944 |
| 2,643,020 | Dalton | June 23, 1953 |
| 2,963,610 | Rimbach | Dec. 6, 1960 |